3,429,709
PROCESS FOR DE-TOXIFYING SUBSTANCES CONTAMINATED WITH AFLATOXIN

Merle Sid Masri, Berkeley, Calif., and Henry L. E. Vix and Leo A. Goldblatt, New Orleans, La., assignors to the United States of America as represented by the Secretary of Agriculture
No Drawing. Filed Oct. 8, 1965, Ser. No. 494,279
U.S. Cl. 99—2         7 Claims
Int. Cl. A23k *1/00;* A23b *9/00*

ABSTRACT OF THE DISCLOSURE

Agricultural products contaminated with aflatoxins are de-toxified by mixing them with at least 0.3 gram of $NH_3$ per kilogram of agricultural product, and heating the mixture at 70–250° F. Enhanced results are attained by moistening the contaminated material to 10–15% $H_2O$, and then heating it at 200–250° F. in an autoclave with $NH_3$ gas under a pressure of 20 p.s.i.g.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for de-toxifying substances which contain aflatoxin. Further objects of the invention will be evident from the following disclosure wherein parts and percentages are by weight unless otherwise indicated. The abbrevaition "ppb" used herein means parts per billion.

It has recently been shown that agricultural products may become infected with strains of the mold *Aspergillus flavus* which produce a group of highly toxic substances known collectively as aflatoxin. For example, severe losses of turkeys and ducks occurred in England in 1960, involving loss of some 100,000 turkeys in a few months. The cause was thought to be a new disease, designated as turkey X disease at the time. Later investigations showed that the deaths were due to a feed which contained peanut meal infected with *A. flavus*.

The extreme toxicity of aflatoxin is demonstrated by the fact that the $LD_{50}$ of the $B_1$ component (believed to be the main toxic component of aflatoxin) is less than 30 micrograms for day-old ducklings. Moreover, aflatoxin has been shown to be toxic to many kinds of animals, including swine, calves, rabbits, fish, guinea pigs, pheasants, and chickens, as well as turkeys and ducks.

Another serious aspect of the problem is that the responsible mold is ubiquitous and is liable to infect agricultural materials of all kinds, particularly if they are exposed to warm and humid conditions. Typical of the substrates which have been found to be contaminated with aflatoxin are peanuts, peanut meal, cottonseed meal, grains such as corn and wheat, fish meal, etc.

The primary object of this invention is the provision of procedures whereby such contaminated materials may be rendered fit for their conventional uses. For example, contaminated seed meals may be rendered suitable for use as animal feeds. Basically, the de-toxification in accordance with the invention is carried out by contacting the contaminated material with ammonia. The primary advantage of the invention is its effectiveness in destroying aflatoxin. Another advantage is that the procedure is simple and the only reagent required is ammonia. Also, after completion of the treatment, residual ammonia can be readily eliminated because of its volatile nature. A last point is that the treatment in accordance with the invention does not cause a deterioration of the material treated. For example, feed materials subjected to the process of the invention retain their nutritive value and so are useful in animal feeding.

As briefly noted above, the detoxification is accomplished by contacting the contaminated material with ammonia. The treatment may be conducted at ambient temperatures. However, destruction of the toxic principles occurs more rapidly with increasing temperature. Consequently, if it is desired to expedite the detoxification, the treatment is accompanied by the application of heat, for example, the material plus added ammonia is held at an elevated temperature, for instance, at 200° F. In general, therefore, the treatment in accordance with the invention may be carried out at temperatures in the range from about 70 to about 250° F.

The ammonia may be applied as such, that is, as gaseous $NH_3$. It may be applied as a gaseous mixture of $NH_3$ and steam. Also, it may be applied in aqueous solution, i.e., as ammonimum hydroxide solutions. To prevent loss of ammonia, the treatment is conducted in a suitably closed vessel. Where the treatment is conducted at or near room temperature a simple closed vessel will be appropriate whereas at higher temperatures a pressure-resistant vessel such as an autoclave is required to retain the ammonia vapors.

Whether the ammonia is applied in liquid or vapor phase, it is employed in large excess as compared with the amount of aflatoxin in the material being treated. Usually, one uses a minimum of about 0.3 gram of $NH_3$ per kilogram of material. To ensure adequate aflatoxin destruction it is preferred to use a large proportion of ammonia, for example, 10–30 grams of $NH_3$ per kg. of material being treated. Where the treatment is carried out with ammonia in gaseous form, it is inconvenient to weight the gas and it suffices to introduce sufficient $NH_3$ gas into the autoclave containing the material to establish an ammonia pressure above atmospheric, for example, 5 to 40 p.s.i.g. This will ensure the presence of more than enough of the reagent to accomplish the desired end.

The time of the treatment will depend on various factors including the amount of aflatoxin in the starting material, concentration of ammonia in the system, the physical and chemical characteristics of the material (for example, the particle size of the material, its porosity or density, its content of fats, etc.) and particularly on the temperature employed. For example, in typical runs with peanut meal it has been found that the treatment may require as much as 7 to 14 days at room temperature whereas at 200° F., the same end is achieved in about 30–60 minutes. Since the time of treatment depends on so many factors, it is impossible to set forth numerical time limits which will be applicable to all cases. In any particular application, optimum time of treatment can be readily ascertained by applying the treatment for different time periods to pilot samples of the material and conducting chemical assays on the products. (These can be carried out quickly by chromatographic methods known in the art.) The resulting data will indicate which treatment time gives optimum results and this can then be applied to the main batch of material to be processed.

It has been observed that the presence of moisture increases the rate and degree of detoxification. Accordingly, it is desirable that moisture be present when materials are treated with ammonia in accordance with the invention. In most cases no extra moisture need be added as the materials will normally contain sufficient moisture. In the event, however, that the material is in an especially dry condition (for example, less than 5% $H_2O$), it would be desirable to add water to the extent that the moisture level of the material is about 5–15%. Of course, in situations where the ammonia is added as an aqueous solution, the water in the ammonia solution will generally suffice and extra moisture need not be added (unless the total moisture in the system is still less than about 5%).

After treatment of the material with ammonia as hereinabove described, the material is treated to remove ammonia. This may be accomplished in various ways, for example, by exposing the material to a vacuum or by purging it with air, nitrogen or other inert gas. In the event that moisture had been added it may be desirable to apply a drying step to reduce the moisture content of the product to a level at which the material will keep. This can be accomplished in conventional manner, for example, by exposing the treated material to a current of hot air.

Although the primary toxic principle elaborated by *A. flavus* is aflatoxin, this mold has another undesirable feature in that the proteins of the mold cells will cause kidney damage when ingested by animals. It thus may be desired to destroy these endotoxins, in addition to destroying aflatoxin. This can be readily accomplished by application of heat. For example, where the ammonia treatment is conducted at a relatively low temperature, the product is purged of residual ammonia and then heated at about 220–260° F. for about 30–60 minutes. A conventional steam-heated autoclave may be employed for this procedure.

The process of the invention is of wide versatility and can be employed to de-toxify materials of all kinds which are contaminated with aflatoxin. The invention is particularly useful in the treatment of agricultural products— of animal or plant origin—since such materials are especially likely to become contaminated with the *A. flavus* mold when exposed to conditions conducive to mold growth. Typical examples of such materials in the category of vegetative cellular materials are seeds and the residues remaining after extraction of oil therefrom, e.g., peanuts (shelled or in-shell), soybeans, peanut meal, cottonseed meal, soybean meal, flaxseed meal; grains such as wheat, barley, rice, rye, oats, corn, and meals or flours prepared from any of these grains; forages such as alfalfa, clover, grasses, sorghum, bran, cowpeas, ensilage, mixed feeds, etc. Other examples of agricultural products include such materials as fish meal, tankage, dried blood, distillery and brewery residues, dried whey, dried milk, casein, dehydrated fruits, vegetables, meats, eggs, etc.

The invention is further demonstrated by the following examples:

EXAMPLE I

The starting material was a commercial hexane-extracted peanut meal known to be contaminated with aflatoxin. Chemical assay of this material indicated 1300 p.p.b. of aflatoxin $B_1$. Analysis of the meal was as follows:

| | Percent |
|---|---|
| Moisture | 6.7 |
| Nitrogen | 7.1 |
| Crude fiber | 13.6 |
| Lipids | 2.28 |
| Ash | 5.55 |

Concentrated ammonium hydroxide (28–30% $NH_3$, sp. g. 0.9) was mixed with the peanut meal in a food mixer for 1–2 minutes, using 100 ml. ammonium hydroxide per kg. of peanut meal. The treated meal was placed in covered pans which were allowed to stand for two days at room temperature. After this holding period, the pans were uncovered for about two hours to permit escape of ammonia vapor and the products then dried in a forced air oven (about 158° F.) to their original weight.

Samples of the untreated meal and the treated meal were then bioassayed, using 2-day old ducklings as test animals. (Ducklings are especially sensitive to aflatoxin, hence are particularly useful for the bioassay.)

The diet supplied to the ducklings was as follows:

| | Percent |
|---|---|
| Peanut meal (treated or untreated) | 70 |
| Casein | 14 |
| Corn oil | 12 |
| Salt mixture, USP XIV | 2 |
| Vitamin mixture | 2 |

The results obtained are tabulated below:

TABLE I.—TREATMENT OF PEANUT MEAL WITH $NH_4OH$ (2 DAYS AT R.T.)

| Sample | Mean body weight, grams, at end of— | | Deaths at end of 2nd week |
|---|---|---|---|
| | 1st week | 2nd week | |
| Treated | 108 | 191 | *0/10 |
| Untreated | 84 | 95 | 6/10 |

*Number after oblique line designated number of ducklings in the feeding test.

EXAMPLE II

The starting material was the aflatoxin-contaminated peanut meal described in Example I. It was treated with ammonium hydroxide exactly as in Example I except that the time of holding at room temperature was 7 days in one case (lot 2); 14 days in another (lot 3). Another portion of the meal (lot 4) was treated with ammonium hydroxide with holding for 14 days at room temperature. Then, after removal of ammonia, the meal was autoclaved for one hour at 15 p.s.i.g. (250° F.).

Samples of the treated and untreated meal were bioassayed using 2-day old ducklings as the test animals.

To provide a datum plane, a feeding test was included using a sample of uncontaminated peanut meal, that is, one which indicated no aflatoxin by chemical tests. Analysis of this meal (designated below as lot 1) was as follows:

| | Percent |
|---|---|
| Moisture | 6.4 |
| Nitrogen | 8.58 |
| Crude fiber | 3.8 |
| Lipids | 8.8 |
| Ash | 4.5 |

Since this material had a somewhat different composition (particularly as to protein, fiber and fat) than the contaminated meal, the test diets were adjusted to provide the same protein level (30%); deficiency in oil content was adjusted by addition of peanut oil, deficiency in fiber by addition of alpha cellulose.

The common test diet contained the following:

| | Percent |
|---|---|
| Protein (all from meal) | 30 |
| Oil (from meal plus added peanut oil as required) | 7 |
| Fiber (from meal plus added alpha cellulose as required) | 12 |
| L-lysine HCl | 0.7 |
| DL-methionine | 0.6 |
| Salt mixture, USP XIV | 4 |
| Vitamin mixture | 3 |
| Cornstarch to make 100%. | |

The requisite amount of protein was provided by a level of 56% of the uncontaminated meal in the ration and by 67% in the case of the treated and untreated contaminated meal.

The results of the bioassay are tabulated below:

TABLE II.—TREATMENT OF PEANUT MEAL WITH NH⁴OH (7-14 DAYS AT R.T.)

| Lot | Material | Aflatoxin B¹ (by chem. assay), ppb. | Mean body wt., g., at end of— 1st wk | Mean body wt., g., at end of— 2nd wk | Deaths at end of 2nd week | Observations |
|---|---|---|---|---|---|---|
| 1 | Uncontaminated meal | 0 | 171 | 385 | 0/20 | Healthy; livers appear normal at autopsy. |
| 2 | Contaminated meal, treated with NH⁴OH, 7 days. | 260 | 143 | 363 | 0/8 | Do. |
| 3 | Contaminated meal, treated with NH⁴OH, 14 days. | (*) | 158 | 378 | 0/10 | Do. |
| 4 | Contaminated meal, treated with NH⁴OH, 14 days, autoclaved 1 hr. at 250° F. | (*) | 170 | 431 | 0/10 | Do. |
| 5 | Contaminated meal, untreated | 1,300 | 102 | 140 | 9/10 | Livers yellowish and fatty at death. |

*Not determined.

It is evident from the above data that the contaminated meal after treatment with ammonia (Lots 2, 3, 4) gave a growth response virtually the same as that obtained with authentic uncontaminated meal (Lot 1) and eliminated the deaths.

EXAMPLE III

The starting material was a commercial hexane-extracted peanut meal containing 709 p.p.b. of aflatoxin $B_1$ by chemical assay. Analysis of this meal was as follows:

|  | Percent |
|---|---|
| Moisture | 3.5 |
| Nitrogen | 9.33 |
| Crude fiber | 4.3 |
| Lipids | 1.79 |
| Ash | 5.06 |

The above meal was treated as follows:

Lot 2: the meal was preheated to 200° F. in a heated mixer and introduced into an autoclave wherein it was ammoniated for 60 minutes at about 200° F. under 20 p.s.i.g. anhydrous ammonia pressure. The meal was then purged of $NH_3$ with nitrogen gas and further de-ammoniated in a forced draft dryer at a temperature of 80° F. for about 2 hours.

Lot 3: same as Lot 2 except that the meal was moistened to bring its $H_2O$ content to 9.6%, prior to ammoniation.

Lot 4: same as Lot 2 except that meal was moistened to bring its moisture content to 14.6%, prior to ammoniation.

Analyses of the ammonia-treated meals after de-ammoniation indicated that about 0.5% ammonia had been added in each case.

The treated and untreated meal and a sample of aflatoxin-free meal were bioassayed by feeding tests with two-day old ducklings. The rations were prepared on a common basis as described in Example II. The results are tabulated below:

TABLE III.—TREATMENT OF PEANUT MEAL WITH NH₃ GAS (60 MIN. AT 200° F.)

| Lot | Material | Aflatoxin B₁ (by chem. assay) p.p.b. | Mean body wt., g., at end of— 1st wk | Mean body wt., g., at end of— 2nd wk | Histopathology (of livers) |
|---|---|---|---|---|---|
| 1 | Contaminated meal, untreated | 709 | 114 | 199 | Severe hyperplasia of bile duct eipthelium and hepatic cell fatty degeneration and necrosis. |
| 2 | Contaminated meal, ammoniated. | 203 | 135 | 264 | Same type of changes in liver as above, except only half or less as extensive. |
| 3 | Contaminated meal moistened to 9.6%, ammoniated. | 25 | 154 | 282 | Proliferation of epithelial cells absent; tissue normal. |
| 4 | Contaminated meal moistened to 14.6%, ammoniated. | 17 | 145 | 322 | Do. |
| 5 | Uncontaminated meal | 0 | 162 | 391 | Do. |

Having thus disclosed the invention, what is claimed is:

1. A process for de-toxifying an agricultural product contaminated with aflatoxin which comprises
   mixing said aflatoxin-contaminated agricultural product with ammonia, in the proportion of at least 0.3 gram of $NH_3$ per kilogram of agricultural product, and
   holding said mixture in a closed vessel at a temperature about from 70 to 250° F. for a period sufficient to cause substantial destruction of the aflatoxin.

2. The process of claim 1 wherein the agricultural product is aflatoxin-contaminated peanut meal.

3. The process of claim 1 wherein the aflatoxin-contaminated agricultural product is moistened to a level of 5 to 15% $H_2O$ prior to mixing it with the ammonia.

4. The process of claim 1 wherein the ammonia is applied in the gaseous state at a pressure of 5 to 40 p.s.i.g.

5. The process of claim 1 wherein the temperature is 200 to 250° F.

6. The process of claim 1 wherein
   the aflatoxin-contaminated agricultural product is moistened to a level of 5 to 15% $H_2O$ prior to mixing it with the ammonia,
   the ammonia is applied in the gaseous state at a pressure of 5 to 40 p.s.i.g.
   and the temperature is about 200 to 250° F.

7. A process for de-toxifying peanut meal contaminated with aflatoxin which comprises moistening the aflatoxin-contaminated peanut meal to bring its H₂O content to a level of about 10 to 15%,
introducing into an autoclave the moistened peanut meal together with sufficient ammonia gas to provide an NH₃ pressure of about 20 p.s.i.g.,
heating the mixture of moistened peanut meal and ammonia in said autoclave and at said pressure to a temperature of about 200° F.,
continuing said heating for a period of about 1 hour,
then removing the treated peanut meal from the autoclave and purging it of ammonia gas.

References Cited

UNITED STATES PATENTS

| | | | |
|---|---|---|---|
| 2,458,680 | 1/1949 | Buxton | 99—2 |
| 2,547,980 | 4/1951 | Saunders | 99—2 |
| 2,551,581 | 5/1951 | Bonotto | 99—2 |
| 2,810,649 | 10/1957 | Bonnell | 99—2 |

A. LOUIS MONACELL, *Primary Examiner.*

N. ROSKIN, *Assistant Examiner.*